US012534817B2

(12) United States Patent
Chen et al.

(10) Patent No.: US 12,534,817 B2
(45) Date of Patent: Jan. 27, 2026

(54) COBALT CATALYST AND PREPARATION METHOD THEREOF

(71) Applicant: Zhejiang Sugar Energy Technology Co., Ltd., Ningbo (CN)

(72) Inventors: Chunlin Chen, Ningbo (CN); Zhenqiang Zhou, Ningbo (CN); Jian Zhang, Ningbo (CN)

(73) Assignee: Zhejiang Sugar Energy Technology Co., Ltd., Ningbo (CN)

( * ) Notice: Subject to any disclaimer, the term of this patent is extended or adjusted under 35 U.S.C. 154(b) by 652 days.

(21) Appl. No.: 17/915,495

(22) PCT Filed: Mar. 31, 2020

(86) PCT No.: PCT/CN2020/082418
§ 371 (c)(1),
(2) Date: Sep. 29, 2022

(87) PCT Pub. No.: WO2021/195957
PCT Pub. Date: Oct. 7, 2021

(65) Prior Publication Data
US 2023/0220572 A1 Jul. 13, 2023

(51) Int. Cl.
*C25B 11/061* (2021.01)
*B01J 35/45* (2024.01)
(Continued)

(52) U.S. Cl.
CPC ............ *C25B 11/061* (2021.01); *B01J 35/45* (2024.01); *C25B 11/02* (2013.01); *C25B 11/075* (2021.01); *C25B 15/029* (2021.01); *C25B 15/08* (2013.01)

(58) Field of Classification Search
CPC ... B01J 23/75; B01J 35/33; B01J 35/45; B01J 35/50; B01J 37/08; B01J 37/20;
(Continued)

(56) References Cited

U.S. PATENT DOCUMENTS

| 2011/0052896 | A1 | 3/2011 | Jayaraman |
| 2015/0017544 | A1* | 1/2015 | Prasad ................. H01M 4/661 252/521.2 |
| 2015/0284259 | A1 | 10/2015 | Kim et al. |

FOREIGN PATENT DOCUMENTS

| CN | 102712493 A | 10/2012 | |
| CN | 108889314 A * | 11/2018 | ............ B01J 27/043 |

(Continued)

OTHER PUBLICATIONS

Machine Translation of CN108889314A.*

*Primary Examiner* — Brian A McCaig
(74) *Attorney, Agent, or Firm* — Bayramoglu Law Offices LLC

(57) ABSTRACT

A cobalt catalyst and a preparation method thereof are provided. The cobalt catalyst includes a carrier and a catalytically active substance; the carrier is a cobalt-based substrate material; the catalytically active substance is grown on the surface of the carrier, and the catalytically active substance has a morphology of hydrangea-shaped nanospheres. The cobalt catalyst is an autogenously grown monolithic nanosphere catalyst with a three-dimensional structure assembled by nano-sheets on the catalyst surface. The cobalt catalyst has a high specific surface area and can fully expose the catalytically active sites to enhance the catalytic efficiency. Compared to a nanowire catalyst, the cobalt catalyst has better self-supporting properties, and the active components are not easily aggregated nor fall off during a use process. Therefore, the cobalt catalyst has a longer service life.

15 Claims, 8 Drawing Sheets

(51) Int. Cl.
  *C25B 11/02* (2021.01)
  *C25B 11/075* (2021.01)
  *C25B 15/029* (2021.01)
  *C25B 15/08* (2006.01)

(58) Field of Classification Search
  CPC ...... B01J 37/34; B01J 37/348; B01J 2235/30; C25B 11/02; C25B 11/061; C25B 11/075; C25B 15/029; C25B 15/08
  See application file for complete search history.

(56)    References Cited

FOREIGN PATENT DOCUMENTS

| | | |
|---|---|---|
| JP | 2007001809 A | 1/2007 |
| JP | 4846280 B2 | 12/2011 |

\* cited by examiner

COBALT CATALYST AND PREPARATION METHOD THEREOF

CROSS REFERENCE TO THE RELATED APPLICATIONS

This application is the national phase entry of International Application No. PCT/CN2020/082418, filed on Mar. 31, 2020, the entire contents of which are incorporated herein by reference.

TECHNICAL FIELD

The present application relates to a cobalt catalyst and a preparation method thereof.

BACKGROUND

Precious metals have excellent catalytic properties and are prominent in the catalysis field. However, precious metals, such as palladium, platinum, gold, ruthenium, and iridium, have limited available reserves and high prices, so the large-scale use of precious metals for industrial catalysis is not a long-term solution. In light of these problems, attention has been focused on developing and utilizing transition metals with multiple valence states.

As one of the transition metals, cobalt itself has specific catalytic properties, which is abundant in reserves and low in price compared to precious metals. Cobalt-based catalysts in practice mostly use oxides, sulfides, and borides of cobalt, which are comparable to precious metals in catalytic ability in some reactions.

Cobalt-based catalysts are usually supported catalysts, which are prone to losing active components during the use process, resulting in gradual deactivation of the catalysts, causing difficulties in product separation and purification, and increasing operational steps and production costs of the whole process of a catalytic reaction.

SUMMARY

In order to solve the above technical problems, the present application provides a cobalt catalyst and a preparation method thereof. The catalytically active substance is grown on the surface of a cobalt-based substrate material, which improves the binding force of the active substance on carrier, extends the service life of catalyst, and reduces the loss of active components.

To achieve the above purpose, the technical solution used in the present application is as follows:

In one aspect of the present application, a cobalt catalyst is provided. The cobalt catalyst includes a carrier and a catalytically active substance.

The carrier is a cobalt-based substrate material.

The catalytically active substance is grown on the surface of the carrier.

The morphology of the catalytically active substance is hydrangea-like nanospheres.

Optionally, the catalytically active material uses the carrier as a cobalt source and is grown on the surface of the carrier autogenously.

Optionally, the cobalt-based substrate material is at least one selected from the group consisting of a cobalt foam, a cobalt sheet, a cobalt foil, and a cobalt wire.

Optionally, the diameter of each nanosphere is 100 nm-500 nm.

Optionally, the thickness of the sheet layer on the surface of the nanospheres is 1 nm-10 nm.

Optionally, the catalytically active substance is cobalt oxyhydroxide.

In another aspect of the present application, a preparation method of the cobalt catalyst is provided. The method at least includes:

S100, heating the carrier and a sulfur source in a protective gas atmosphere for conducting a reaction to obtain a precursor;

S200, subjecting the precursor in an electrolyte for electrical activation to obtain the cobalt catalyst.

Optionally, step S100 includes:
a. obtaining a dry powder as the sulfur source;
b. immersing the carrier in a washing solution, washing, and drying;
c. heating the dry powder and the carrier in the protective gas atmosphere for conducting the reaction to obtain the precursor.

Specifically, step a includes: drying the sulfur source at a preset temperature in the protective gas atmosphere with a preset flow rate for a certain time.

Specifically, the preset temperature is 20° C.-40° C.

The protective gas is at least one of nitrogen, argon, and helium.

The flow rate of the protective gas is 50 mL/min-150 mL/min.

Preferably, the sulfur source is dried at 30° C. for a certain time in a 100 mL/min nitrogen atmosphere to remove the contained moisture.

In the present application, there is no special limitation on the drying time of the selected sulfur source. In order to prepare monolithic hydrangea-like cobalt oxyhydroxide nanosphere catalysts with excellent performance and high purity, preferably, the drying time is 1 h-5 h.

Specifically, in step b, the washing solution is at least one selected from the group consisting of anhydrous ethanol and acetone.

The washing is performed by ultrasonic cleaning for 5 min-30 min.

The drying is carried out at 40° C.-60° C. for 2 h-6 h.

Preferably, step b includes: immersing the carrier in anhydrous ethanol, performing an ultrasonic cleaning for 10 min, and drying at 60° C. for 4 h.

In order to successfully prepare a monolithic catalyst, the carrier should be the cobalt-based material, and preferably, the carrier is a cobalt foam, a cobalt sheet, a cobalt foil, etc. that can play a support role themselves.

Specifically, step S100 uses a heating furnace as the reaction device. In this step, the precursor is obtained through a sulfidation process. The heating furnace is preferably a tube furnace internally provided with a quartz tube or a corundum tube for the convenience of introducing the protective gas. The protective gas is preferably one or more of nitrogen, argon, and helium. The flow rate of the protective gas should not be too large, preferably 10 mL/min-100 mL/min. This flow rate can prevent the dry sulfur source powder from being blown away directly and prevent the ablation of the product, thus improving the quality of the product and enhancing the mechanical and chemical properties of the product.

Specifically, the upper limit of the flow rate of the protective gas is independently selected from 60 mL/min, 70 mL/min, 80 mL/min, 90 mL/min, and 100 mL/min; the lower limit of the flow rate of the protective gas is independently selected from 10 mL/min, 20 mL/min, 30 mL/min, 40 mL/min, and 50 mL/min.

Optionally, in step S100, the mass ratio of the sulfur source to the carrier is (2-10):1.

Preferably, the sulfur source is at least one of sublimed sulfur, sodium sulfide, and thiourea.

Specifically, the upper limit of the mass ratio of the sulfur source to the carrier is independently selected from 4:1, 5:1, 7:1, 8:1, and 10:1; the lower limit of the mass ratio of the sulfur source to the carrier is independently selected from 2:1, 3:1, 3.8:1, 4.3:1, and 5.4:1.

Optionally, in step S100, the temperature of the reaction under heating is 300° C.-400° C., and the reaction time is 0.25 h-2 h.

To ensure product quality, the heating rate should not be too fast. Preferably, the heating rate of the reaction under heating is 5° C./min-10° C./min.

Specifically, the upper limit of the temperature of the reaction under heating is independently selected from 350° C., 360° C., 370° C., 380° C., and 400° C.; the lower limit of the temperature of the reaction under heating is independently selected from 300° C., 310° C., 320° C., 330° C., and 340° C.

Specifically, the upper limit of the reaction time is independently selected from 1 h, 1.2 h, 1.5 h, 1.7 h, and 2 h; and the lower limit of the reaction time is independently selected from 0.25 h, 0.5 h, 0.75 h, 1 h, and 1.25 h.

Specifically, the upper limit of the heating rate is independently selected from 7.5° C./min, 8° C./min, 8.5° C./min, 9° C./min, and 10° C./min; the lower limit of the heating rate is independently selected from 5° C./min, 5.5° C./min, 6° C./min, 6.5° C./min, and 7° C./min.

Optionally, step S200 includes:

Subjecting the precursor as an anode in the electrolyte for electrical activation, then washing and drying to obtain the cobalt catalyst.

Specifically, the precursor is used as the anode, together with a cathode and a reference electrode, to form a three-electrode electrolytic cell, activated electrically in the electrolyte, and washed and dried to obtain the cobalt catalyst.

Optionally, the cathode is at least one of a graphite rod, a platinum wire, a platinum mesh, and a platinum sheet.

The reference electrode is any one of a mercury/mercuric oxide electrode, a saturated calomel electrode, and a silver/silver chloride electrode.

The electrolyte is at least one of a potassium hydroxide solution and a sodium hydroxide solution.

The concentration of the electrolyte is 0.01 M-1 M.

Preferably, step S200 includes: subjecting the precursor as the anode, the graphite rod as the cathode, and the mercury/mercuric oxide electrode as the reference electrode to form the three-electrode electrolytic cell, conducting the electrical activation in the electrolyte with a concentration of 1 M, then washing and drying to obtain the monolithic hydrangea-like cobalt oxyhydroxide nanosphere catalyst.

Specifically, the upper limit of the concentration of the electrolyte is independently selected from 0.6 M, 0.7 M, 0.8 M, 0.9 M, and 1 M; the lower limit of the concentration of the electrolyte is independently selected from 0.01 M, 0.05 M, 0.1 M, 0.3 M, and 0.5 M.

In step S200, the methods for performing the electrical activation include cyclic voltammetry, linear voltammetry, the constant current method, the chronopotentiometry method, and other methods capable of applying positive potential to oxidize and transform the cobalt sulfide precursor into cobalt oxyhydroxide. In order to ensure the catalytic performance and stability of the product, the electrical activation should not be performed at a too high speed and too long or short time.

Preferably, the cyclic voltammetry or the linear voltammetry is used. Preferably, the parameters of the electrical activation include a potential window of −0.3 V vs. RHE-1.4 V vs. RHE and an activation time of 0.5 h-4 h.

Specifically, the upper limit of the window potential is independently selected from 0.8 V vs. RHE, 0.9 V vs. RHE, 1.0 V vs. RHE, 1.2 V vs. RHE, and 1.4 V vs. RHE; the lower limit of the window potential is independently selected from −0.3 V vs. RHE, −0.2 V vs. RHE, −0.1 V vs. RHE, 0.5 V vs. RHE, and 0.7 V vs. RHE.

Specifically, the upper limit of the activation time is independently selected from 2 h, 2.5 h, 3 h, 3.5 h, and 4 h; the lower limit of the activation time is independently selected from 0.5 h, 0.75 h, 1 h, 1.25 h, and 1.5 h.

Preferably, the conditions of performing the electrical activation with the constant current method include: setting a current density of 0.1 mA/cm$^2$-100 mA/cm$^2$, inputting the constant current for activation until the potential is stable, activating for 1 min-60 min.

Specifically, the upper limit of the current density is independently selected from 50 mA/cm$^2$, 60 mA/cm$^2$, 70 mA/cm$^2$, 80 mA/cm$^2$, and 100 mA/cm$^2$; the lower limit of the current density is independently selected from 0.1 mA/cm$^2$, 1 mA/cm$^2$, 10 mA/cm$^2$, 20 mA/cm$^2$, and 30 mA/cm$^2$.

Specifically, the upper limit of the activation time is independently selected from 25 min, 30 min, 40 min, 50 min, and 60 min; the lower limit of the activation time is independently selected from 1 min, 5 min, 10 min, 15 min, and 20 min.

Preferably, the conditions of performing the electrical activation with the chronopotentiometry method include: maintaining the current input for 1 min-60 min within the potential range of 1 V-1.6 V (relative to a reversible hydrogen electrode).

Specifically, the upper limit of the potential range is independently selected from 1.3 V, 1.35 V, 1.4 V, 1.5 V, and 1.6 V; and the lower limit of the potential range is independently selected from 1.0 V, 1.1 V, 1.15 V, 1.2 V, and 1.25 V.

Specifically, the upper limit of the activation time is selected from 25 min, 30 min, 40 min, 50 min, and 60 min; the lower limit of the activation time is selected from 1 min, 5 min, 10 min, 15 min, and 20 min.

The activated catalyst surface carries a small amount of electrolyte. In order to remove the electrolyte, a washing operation is needed. Preferably, the washing method includes: washing the catalyst with deionized water 2 to 3 times. After washing, the catalyst is dried to prolong the service life of the catalyst.

Optionally, the drying is conducted at 40° C.-60° C. for 6 h-12 h. Specifically, the upper limit of the drying temperature is independently selected from 51° C., 53° C., 55° C., 57° C., and 60° C.; the lower limit of the drying temperature is independently selected from 40° C., 42° C., 45° C., 48° C., and 50° C.

Specifically, the upper limit of the drying time is independently selected from 9 h, 10 h, 10.5 h, 11 h, and 12 h; the lower limit of the drying time is independently selected from 6 h, 6.5 h, 7 h, 7.5 h, and 8 h.

The advantages of the present application are as follows:

(1) The cobalt catalyst provided in the present application has strong catalytic performance, the active components are not easily aggregated nor fall off during the use process, and the catalyst is easy to be separated after use.

(2) The autogenously grown monolithic cobalt catalyst provided in the present application has a three-dimensional structure assembled by nano-sheets on the surface of the autogenously grown monolithic hydrangea-like nanosphere catalyst, which has a high specific surface area and can fully expose the catalytically active sites to enhance the catalytic efficiency. Meanwhile, the number and thickness of the sheet layer on the surface of the nanospheres can be controlled by adjusting the preparation conditions to provide effective mass transfer channels for different reactants to meet the needs of various reactions. Compared to nanowire catalysts, nanosphere catalysts with rough surfaces have better self-supporting properties, are not easily aggregated, and possess a longer service life.

(3) In the preparation method of the cobalt catalyst provided by the present application, the generation of nanosphere-like morphology is induced by sulfidation, the change in the number and size of nanospheres is controlled by changing the sulfidation conditions, and activation is subsequently performed to form hydrangea-like cobalt oxyhydroxide nanospheres. No additional templates are needed, thus saving costs and involving inventiveness.

(4) The preparation method of the cobalt catalyst provided in the present application requires raw materials that are widely available, involves simple operations, and leads to high production efficiency. The product prepared by this method is high in yield and low in cost.

BRIEF DESCRIPTION OF THE DRAWINGS

FIG. 4A is cobalt element and FIG. 4B is oxygen element.

FIG. 5A is at a scale bar of 50 nm and FIG. 5B is at a scale bar of 10 nm.

Figure 1:
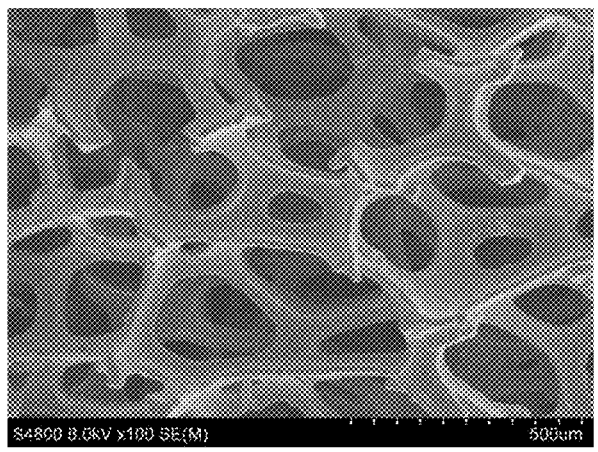
FIG. 1 is a scanning electron microscope image of an autogenously grown monolithic hydrangea-like cobalt oxyhydroxide catalyst prepared in Embodiment 1 of the present application, at a scale bar of 500 μm.

LIST OF COMPONENTS AND REFERENCE NUMERALS 1, power supply; 2, anode; 3, cathode; 4, electrolyte; 5, gas guide tube; 6, measuring cylinder; 7, water tank; 8, water.

DETAILED DESCRIPTION OF THE EMBODIMENT

The present application is further described below in conjunction with the accompanying drawings and specific embodiments.

The experimental methods used in the following embodiments are conventional methods unless otherwise specified. The reagents, materials, etc. used in the following embodiments are commercially available unless otherwise specified. The instruments used in the following embodiments imply the parameters recommended by the manufacturers unless otherwise specified.

The instruments and parameters used in sample analysis in the embodiments are as follows:

SEM analysis was performed using a HITACHI S-4800 scanning electron microscope at 8.0 kV.

EDX analysis was performed using the HITACHI S-4800 scanning electron microscope at 20.0 kV.

TEM analysis was performed using an FEI F20 transmission electron microscope at 200 kV.

Selected area electron diffraction analysis was performed using the FEI F20 transmission electron microscope at 200 kV.

Embodiment 1

(1) 1500 mg of sublimed sulfur powder was placed in a corundum boat of a tube furnace, sealed, and dried at 30° C. in a nitrogen atmosphere of 100 mL/min for 2 h to remove the moisture contained.

(2) 280 mg of cobalt foam was immerged in anhydrous ethanol, subjected to an ultrasonic washing for 10 min, and then dried at 60° C. for 4 h.

(3) The dried sublimed sulfur powder obtained in step (1) and the cobalt foam obtained in step (2) were placed in the corundum boat of the tube furnace and sealed. Subsequently, high purity nitrogen was introduced as the protective gas throughout the process, and the flow rate of nitrogen was 50 mL/min. The temperature was increased to 350° C. at a rate of 5° C./min and held for 0.5 h. The resulting product was naturally cooled to room temperature to obtain a precursor. The mass ratio of the sublimed sulfur powder to the cobalt foam is 5.4:1.

(4) The precursor obtained in step (3) was configured as an anode, a graphite rod was configured as a cathode, and a mercury/mercuric oxide electrode was configured as a reference electrode to form a three-electrode electrolytic cell. The precursor was activated in a potassium hydroxide solution having a concentration of 1 M by cyclic voltammetry at a potential window of −0.3 V vs. RHE-1.4 V vs. RHE for 1 h. The resulting precursor was rinsed 2 times with deionized water and dried at 60° C. for 10 h to obtain an autogenously grown monolithic hydrangea-like cobalt oxyhydroxide nanosphere catalyst, denoted as sample 1.

Embodiment 2

(1) 1500 mg of sublimed sulfur powder was placed in a corundum boat of a tube furnace, sealed, and dried at 30° C. in a nitrogen atmosphere of 100 mL/min for 2 h to remove the moisture contained.

(2) 500 mg of cobalt foam was immerged in anhydrous ethanol, subjected to an ultrasonic washing for 10 min, and then dried at 60° C. for 4 h.

(3) The dried sublimed sulfur powder obtained in step (1) and the cobalt foam obtained in step (2) were placed in the corundum boat of the tube furnace and sealed. Subsequently, high purity nitrogen was introduced as the protective gas throughout the process, and the flow rate of nitrogen was 50 mL/min. The temperature was increased to 350° C. at a rate of 5° C./min and held for 0.5 h. The resulting product was naturally cooled to room temperature to obtain a precursor. The mass ratio of the sublimed sulfur powder to the cobalt foam is 3:1.

(4) The precursor obtained in step (3) was configured as an anode, a graphite rod was configured as a cathode, and a mercury/mercuric oxide electrode was configured as a reference electrode to form a three-electrode electrolytic cell. The precursor was activated in a potassium hydroxide solution having a concentration of 1 M by cyclic voltammetry at a potential window of −0.3 V vs. RHE-1.4 V vs. RHE for 1 h. The resulting precursor was rinsed 2 times with deionized water and dried at 60° C. for 10 h to obtain an autogenously grown monolithic hydrangea-like cobalt oxyhydroxide nanosphere catalyst, denoted as sample 2.

Compared to Embodiment 1, the mass of the carrier used in Embodiment 2 was changed, and the rest of the preparation conditions remained unchanged. As the mass of the carrier increases, the number of cobalt oxyhydroxide nanospheres in the final catalyst decreases.

Embodiment 3

(1) 500 mg of sublimed sulfur powder was placed in a corundum boat of a tube furnace, sealed, and dried at 30° C. in a nitrogen atmosphere of 100 mL/min for 2 h to remove the moisture contained.

(2) 250 mg of cobalt foam was immerged in anhydrous ethanol, subjected to an ultrasonic washing for 10 min, and then dried at 60° C. for 4 h.

(3) The dried sublimed sulfur powder obtained in step (1) and the cobalt foam obtained in step (2) were placed in the corundum boat of the tube furnace and sealed. Subsequently, high purity nitrogen was introduced as the protective gas throughout the process, and the flow rate of nitrogen was 50 mL/min. The temperature was increased to 350° C. at a rate of 5° C./min and held for 0.5 h. The resulting product was naturally cooled to room temperature to obtain a precursor. The mass ratio of the sublimed sulfur powder to the cobalt foam is 2:1.

(4) The precursor obtained in step (3) was configured as an anode, a graphite rod was configured as a cathode, and a mercury/mercuric oxide electrode was configured as a reference electrode to form a three-electrode electrolytic cell. The precursor was activated in a potassium hydroxide solution having a concentration of 1 M by cyclic voltammetry at a potential window of −0.3 V vs. RHE-1.4 V vs. RHE for 1 h. The resulting precursor was rinsed 2 times with deionized water and dried at 60° C. for 10 h to obtain an autogenously grown monolithic hydrangea-like cobalt oxyhydroxide nanosphere catalyst, denoted as sample 3.

Compared to Embodiment 1, the mass of the sulfur source used in Embodiment 3 was changed, and the rest of the preparation conditions remained unchanged. As the mass of the sulfur source decreases, the number of cobalt oxyhydroxide nanospheres in the final catalyst decreases.

Embodiment 4

(1) 1500 mg of sublimed sulfur powder was placed in a corundum boat of a tube furnace, sealed, and dried at 30° C. in a nitrogen atmosphere of 100 mL/min for 4 h to remove the moisture contained.

(2) 350 mg of cobalt foam was immerged in anhydrous ethanol, subjected to an ultrasonic washing for 10 min, and then dried at 60° C. for 4 h.

(3) The dried sublimed sulfur powder obtained in step (1) and the cobalt foam obtained in step (2) were placed in the corundum boat of the tube furnace and sealed. Subsequently, high purity nitrogen was introduced as the protective gas throughout the process, and the flow rate of nitrogen was 100 mL/min. The temperature was increased to 350° C. at a rate of 5° C./min and held for 1 h. The resulting product was naturally cooled to room temperature to obtain a precursor. The mass ratio of the sublimed sulfur powder to the cobalt foam is 4.3:1.

(4) The precursor obtained in step (3) was configured as an anode, a graphite rod was configured as a cathode, and a mercury/mercuric oxide electrode was configured as a reference electrode to form a three-electrode electrolytic cell. The precursor was activated in a potassium hydroxide solution having a concentration of 1 M by cyclic voltammetry at a potential window of −0.3 V vs. ME-1.4 V vs. RHE for 1.5 h. The resulting precursor was rinsed 2 times with deionized water and dried at 60° C. for 12 h to obtain an autogenously grown monolithic hydrangea-like cobalt oxyhydroxide nanosphere catalyst, denoted as sample 4.

Embodiment 5

(1) 1000 mg of sodium sulfide powder was placed in a corundum boat of a tube furnace, sealed, and dried at 30° C. in a nitrogen atmosphere of 100 mL/min for 5 h to remove the moisture contained.

(2) 250 mg of cobalt foam was immerged in anhydrous ethanol, subjected to an ultrasonic washing for 10 min, and then dried at 60° C. for 4 h.

(3) The dried sodium sulfur powder obtained in step (1) and the cobalt foam obtained in step (2) were placed in the corundum boat of the tube furnace and sealed. Subsequently, high purity argon was introduced as the protective gas throughout the process, and the flow rate of argon was 50 mL/min. The temperature was increased to 350° C. at a rate of 5° C./min and held for 0.5 h. The resulting product was naturally cooled to room temperature to obtain a precursor. The mass ratio of the sodium sulfur powder to the cobalt foam is 4:1.

(4) The precursor obtained in step (3) was configured as an anode, a graphite rod was configured as a cathode, and a mercury/mercuric oxide electrode was configured as a reference electrode to form a three-electrode electrolytic cell. The precursor was activated in a sodium hydroxide solution having a concentration of 1 M by cyclic voltammetry at a potential window of −0.3 V vs. RHE-1.4 V vs. RHE for 1 h. The resulting precursor was rinsed 3 times with deionized water and dried at 60° C. for 10 h to obtain an autogenously grown monolithic hydrangea-like cobalt oxyhydroxide nanosphere catalyst, denoted as sample 5.

Embodiment 6

(1) 1500 mg of thiourea powder was placed in a corundum boat of a tube furnace, sealed, and dried at 30° C. in a nitrogen atmosphere of 100 mL/min for 5 h to remove the moisture contained.

(2) 300 mg of cobalt foam was immersed in anhydrous ethanol, subjected to an ultrasonic washing for 10 min, and then dried at 60° C. for 4 h.

(3) The dried thiourea powder obtained in step (1) and the cobalt foam obtained in step (2) were placed in the corundum boat of the tube furnace and sealed. Subsequently, high purity argon was introduced as the protective gas throughout the process, and the flow rate of argon was 40 mL/min. The temperature was increased to 300° C. at a rate of 6.5° C./min and held for 1 h. The resulting product was naturally cooled to room temperature to obtain a precursor. The mass ratio of the thiourea powder to the cobalt foam is 3:1.

(4) The precursor obtained in step (3) was configured as an anode, a graphite rod was configured as a cathode, and a mercury/mercuric oxide electrode was configured as a reference electrode to form a three-electrode electrolytic cell. The precursor was activated in a potassium hydroxide solution having a concentration of 1 M by cyclic voltammetry at a potential window of −0.3 V vs. RHE-1.4 V vs. RHE for 2 h. The resulting precursor was rinsed 3 times with deionized water and dried at 60° C. for 8 h to obtain an autogenously grown monolithic hydrangea-like cobalt oxyhydroxide nanosphere catalyst, denoted as sample 6.

Embodiment 7

(1) 1500 mg of sublimed sulfur powder was placed in a corundum boat of a tube furnace, sealed, and dried at 30° C. in a nitrogen atmosphere of 100 mL/min for 3 h to remove the moisture contained.

(2) 400 mg of cobalt sheet was immersed in anhydrous ethanol, subjected to an ultrasonic washing for 10 min, and then dried at 60° C. for 4 h.

(3) The dried sublimed sulfur powder obtained in step (1) and the cobalt sheet obtained in step (2) were placed in the corundum boat of the tube furnace and sealed. Subsequently, high purity argon was introduced as the protective gas throughout the process, and the flow rate of argon was 80 mL/min. The temperature was increased to 400° C. at a rate of 8° C./min and held for 0.5 h. The resulting product was naturally cooled to room temperature to obtain a precursor. The mass ratio of the sublimed sulfur powder to the cobalt sheet is 3.8:1.

(4) The precursor obtained in step (3) was configured as an anode, a graphite rod was configured as a cathode, and a mercury/mercuric oxide electrode was configured as a reference electrode to form a three-electrode electrolytic cell. The precursor was activated in a potassium hydroxide solution having a concentration of 1 M by cyclic voltammetry at a potential window of −0.3 V vs. RHE-1.4 V vs. RHE for 2 h. The resulting precursor was rinsed 3 times with deionized water and dried at 60° C. for 8 h to obtain an autogenously grown monolithic hydrangea-like cobalt oxyhydroxide nanosphere catalyst, denoted as sample 7.

Embodiment 8

(1) 1200 mg of sublimed sulfur powder was placed in a corundum boat of a tube furnace, sealed, and dried at 30° C. in a nitrogen atmosphere of 100 mL/min for 4 h to remove the moisture contained.

(2) 400 mg of cobalt foil was immersed in anhydrous ethanol, subjected to an ultrasonic washing for 10 min, and then dried at 60° C. for 4 h.

(3) The dried sublimed sulfur powder obtained in step (1) and the cobalt foil obtained in step (2) were placed in the corundum boat of the tube furnace and sealed. Subsequently, high purity argon was introduced as the protective gas throughout the process, and the flow rate of argon was 50 mL/min. The temperature was increased to 350° C. at a rate of 7° C./min and held for 1 h. The resulting product was naturally cooled to room temperature to obtain a precursor. The mass ratio of the sublimed sulfur powder to the cobalt foil is 3:1.

(4) The precursor obtained in step (3) was configured as an anode, a graphite rod was configured as a cathode, and a mercury/mercuric oxide electrode was configured as a reference electrode to form a three-electrode electrolytic cell. The precursor was activated in a potassium hydroxide solution having a concentration of 1 M by constant current method where the current having a current density of 5 mA/cm$^2$ was input for the activation until the potential was stable and maintained for 10 min. The resulting precursor was rinsed 2 times with deionized water and dried at 50° C. for 12 h to obtain an autogenously grown monolithic hydrangea-like cobalt oxyhydroxide nanosphere catalyst, denoted as sample 8.

Embodiment 9

(1) 1500 mg of sublimed sulfur powder was placed in a corundum boat of a tube furnace, sealed, and dried at 30° C. in a nitrogen atmosphere of 100 mL/min for 3 h to remove the moisture contained.

(2) 500 mg of cobalt sheet was immersed in anhydrous ethanol, subjected to an ultrasonic washing for 10 min, and then dried at 60° C. for 4 h.

(3) The dried sublimed sulfur powder obtained in step (1) and the cobalt sheet obtained in step (2) were placed in the corundum boat of the tube furnace and sealed. Subsequently, high purity argon was introduced as the protective gas throughout the process, and the flow rate of argon was 60 mL/min. The temperature was increased to 380° C. at a rate of 5° C./min and held for 1 h. The resulting product was naturally cooled to room temperature to obtain a precursor. The mass ratio of the sublimed sulfur powder to the cobalt sheet is 3:1.

(4) The precursor obtained in step (3) was configured as an anode, a graphite rod was configured as a cathode, and a mercury/mercuric oxide electrode was configured as a reference electrode to form a three-electrode electrolytic cell. The precursor was activated in a potassium hydroxide solution having a concentration of 1 M by chronopotentiometry method at a potential window of 1.4 V (relative to a reversible hydrogen electrode) for 60 min. The resulting precursor was rinsed 3 times with deionized water and dried at 40° C. for 12 h to obtain an autogenously grown monolithic hydrangea-like cobalt oxyhydroxide nanosphere catalyst, denoted as sample 9.

Embodiment 10

Sample 1-sample 9 were subjected to SEM, EDX, and TEM tests.

Figure 2:
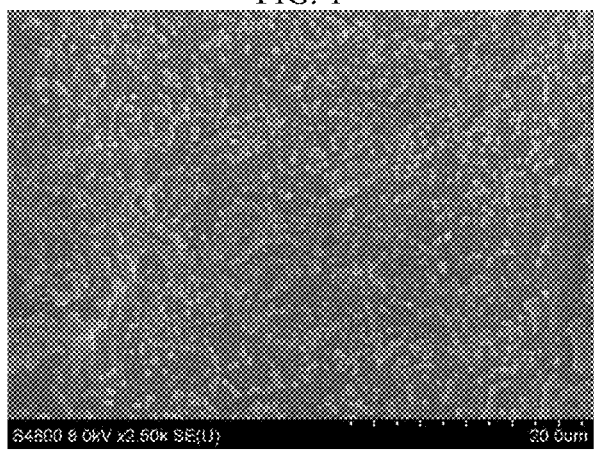
FIG. 2 is a scanning electron microscope image of the autogenously grown monolithic hydrangea-like cobalt oxyhydroxide catalyst prepared in Embodiment 1 of the present application, at a scale bar of 20 μm.
Figure 3:
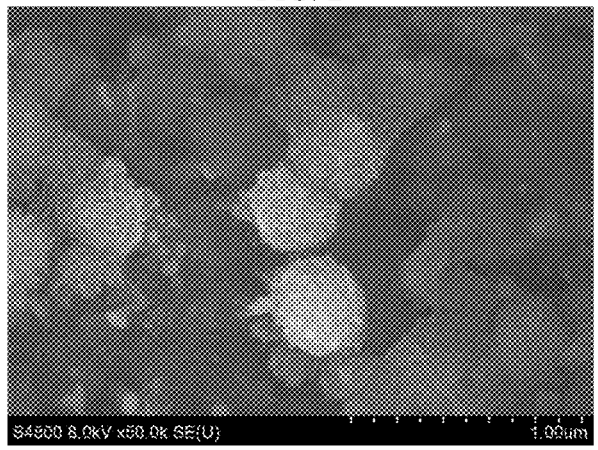
FIG. 3 is a scanning electron microscope image of the autogenously grown monolithic hydrangea-like cobalt oxyhydroxide catalyst prepared in Embodiment 1 of the present application, at a scale bar of 1 μm.

FIGS. 1 to 3 are scanning electron microscope images of sample 1. It can be seen that the microstructure of the catalyst is in the morphology of hydrangea-like nanospheres and the surface of the nanospheres is a three-dimensional structure assembled by nano-sheets, which has good mechanical properties.

Figure 4A:
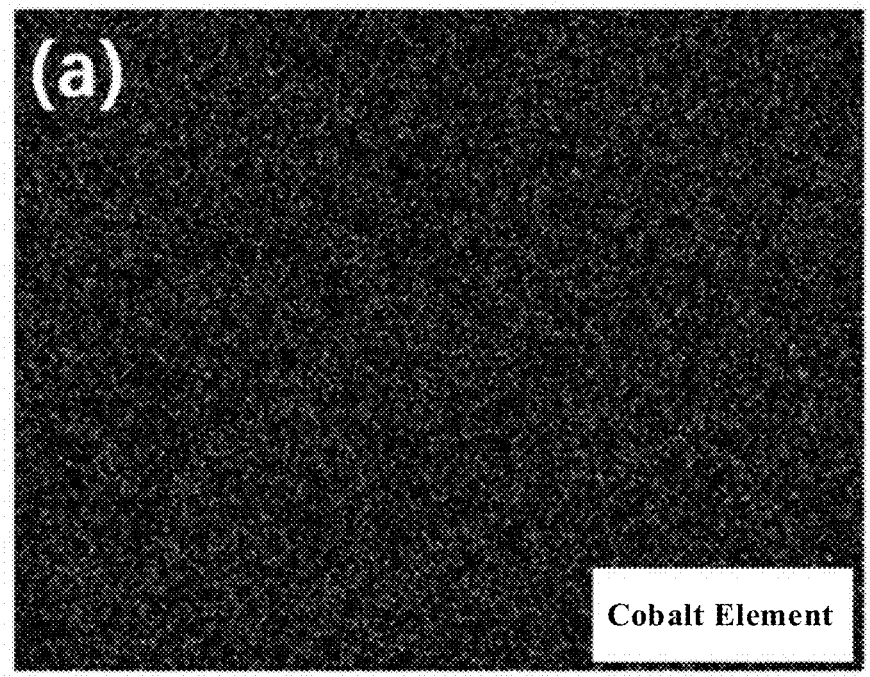
FIGS. 4A and 4B are EDX graphs showing elemental distributions of the autogenously grown monolithic hydrangea-like cobalt oxyhydroxide catalyst prepared in Embodiment 1 of the present application; where
Figure 4B:
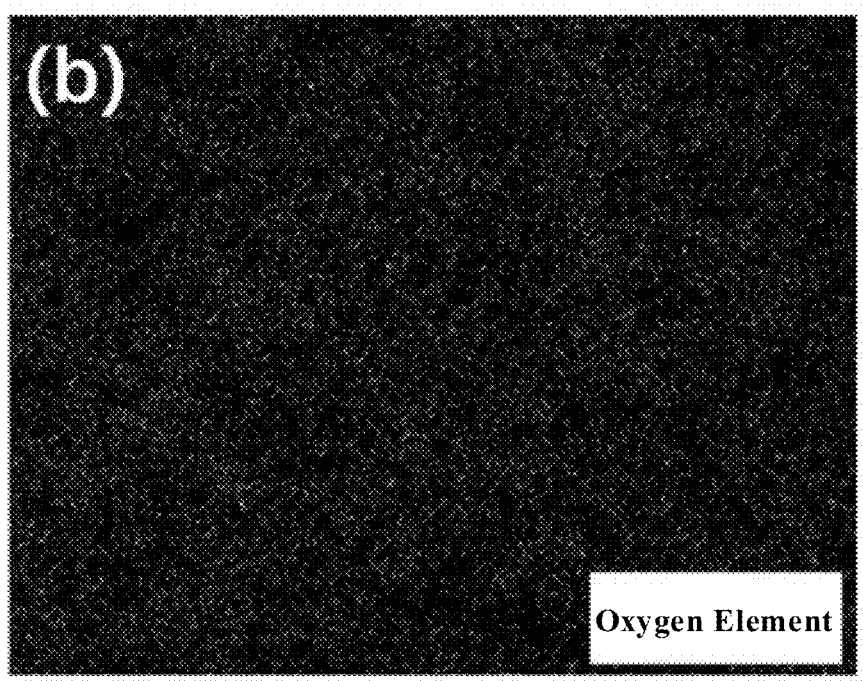

FIGS. 4A and 4B are EDX graphs showing the elemental distribution of sample 1. It can be seen that cobalt element and oxygen element are uniformly distributed.

Figure 5A:
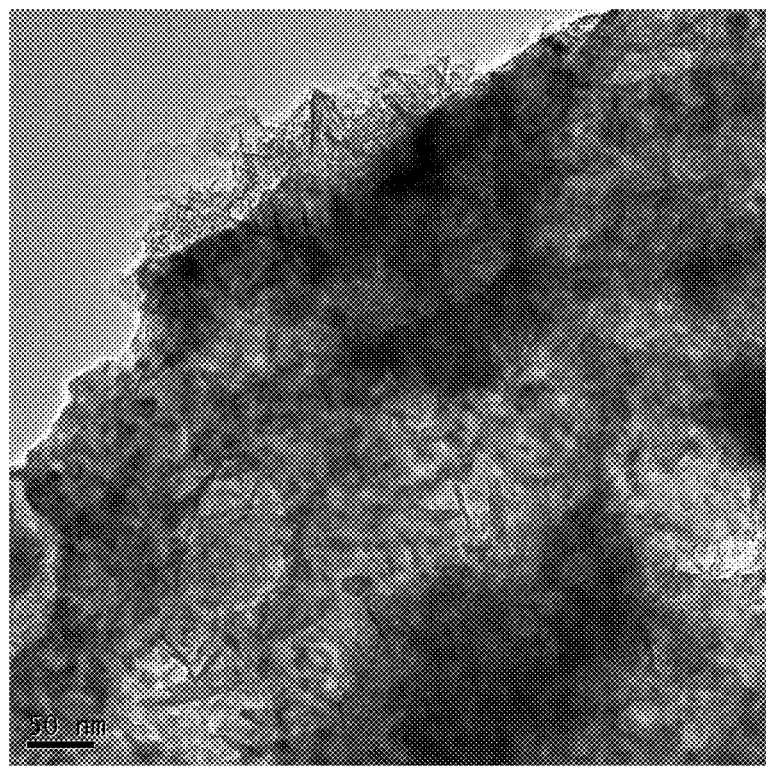
FIGS. 5A and 5B are transmission electron microscope images of the autogenously grown monolithic hydrangea-like cobalt oxyhydroxide catalyst prepared in Embodiment 1 of the present application; where
Figure 5B:
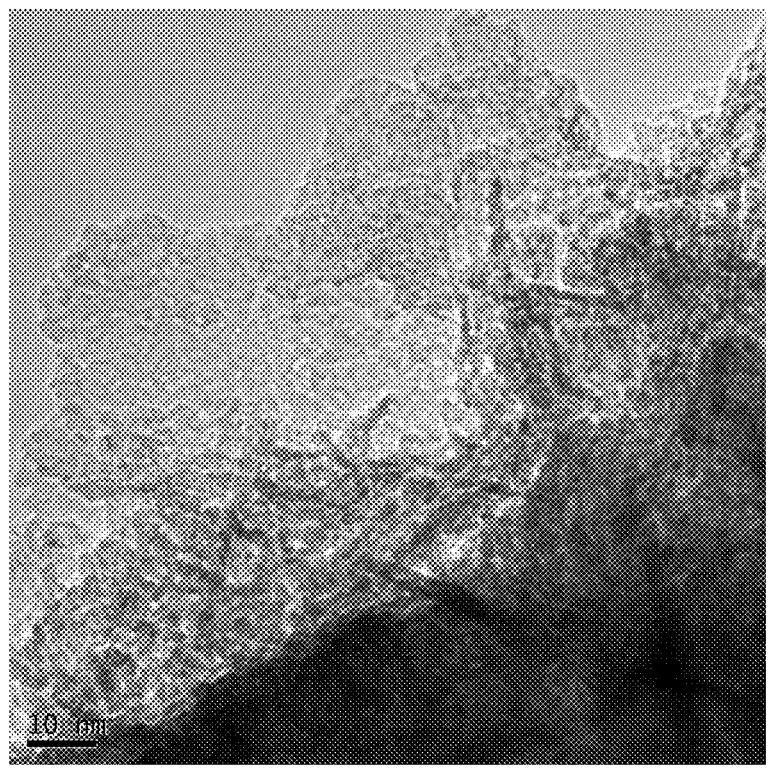

FIGS. 5A and 5B are transmission electron microscope images of sample 1. It can be seen that the surface of the nanospheres of the catalyst is a three-dimensional structure assembled by nano-sheets, and the characterization result is consistent with that of the scanning electron microscope image.

Figure 6:
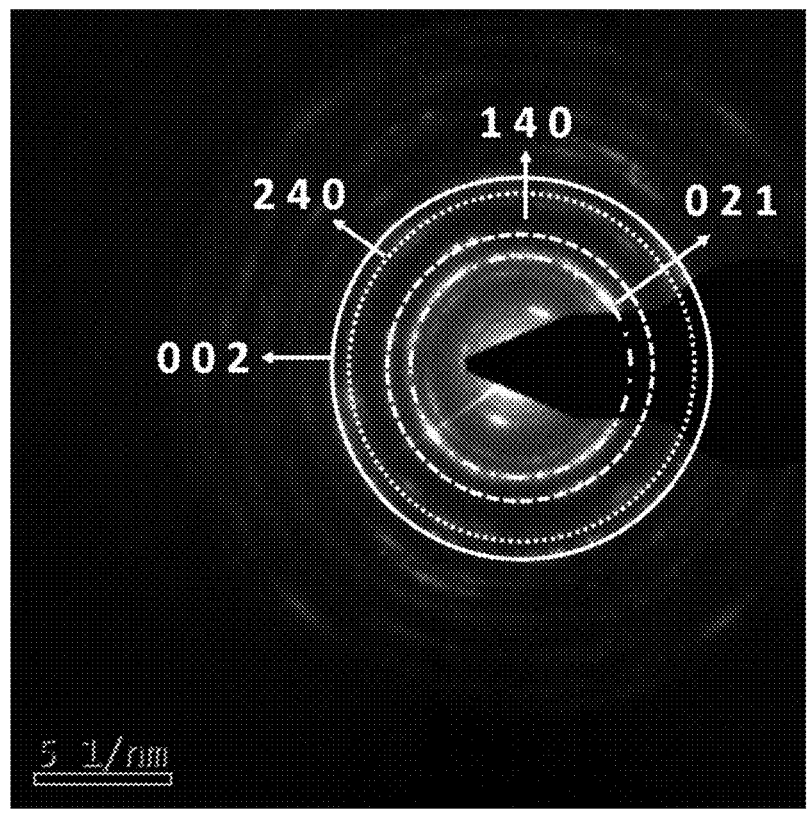
FIG. 6 is a selected area electron diffraction pattern of the autogenously grown monolithic hydrangea-like cobalt oxyhydroxide catalyst prepared in Embodiment 1 of the present application.

FIG. 6 is a selected area electron diffraction pattern of sample 1. It can be seen that the electron diffraction rings correspond to the (0 0 2), (2 4 0), (1 4 0), and (0 2 1) facets of the cobalt oxyhydroxide standard card 26-0480, which confirms that the catalyst phase is cobalt oxyhydroxide.

The SEM images, the elemental distribution graphs, and the TEM images of sample 2-sample 9 are similar to those of sample 1, with the only differences in the number and size of nanospheres.

The selected area electron diffraction patterns of sample 2-sample 9 are consistent with that of sample 1, which confirms that all the catalyst phases are cobalt oxyhydroxide.

Embodiment 11

Working electrode preparation: Sample 1-sample 9 and pure cobalt foams were respectively fixed by stainless steel electrode clamps to prepare working electrodes.

Counter electrode: Graphite rod was configured as a counter electrode.

Three-electrode electrolytic cell: The working electrode was configured as an anode, the counter electrode was configured as a cathode, and the mercury/mercuric oxide electrode was configured as a reference electrode to be fixed in a Teflon plug and fixed in a 10 mL reaction cell.

Two-electrode symmetric electrolytic cell: The cathode and the anode were two identical working electrodes, and the reactor volume was 10 mL or more.

Under normal temperature and pressure conditions, the electrocatalytic performance was tested in the assembled two-electrode system at a controlled electrolytic cell voltage of 1.7 V with a potassium hydroxide (1 M) solution and a potassium hydroxide (1 M) solution containing 10 mM 2,5-furandimethanol (BHMF), respectively.

Figure 7:
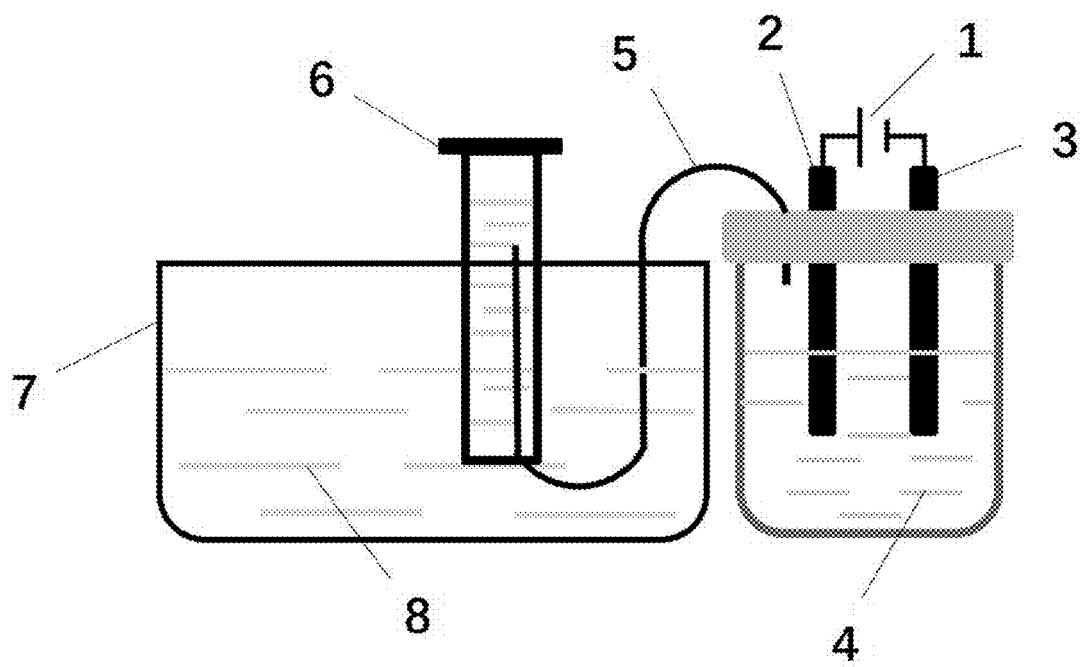
FIG. 7 is a schematic diagram showing the structure of the device in Embodiment 11 of the present application.

The test apparatus is shown in FIG. 7. An electrolytic cell is constructed to include the power supply 1, the electrolyte 4, the anode 2, the cathode 3, and a current loop. The electrolyte is placed in a sealed reactor. The gas produced by the cathode is introduced into a gas collection device through the gas guide tube 5, and the gas volume is obtained by a drainage method. The gas collection device includes the measuring cylinder 6, the measuring cylinder 6 is filled with water and inverted in the water tank 7 containing the water 8, and the outlet of the gas guide tube is located in the measuring cylinder 6. Only a lower voltage is required to drive the coupling reaction when the electrolyte is the potassium hydroxide (1 M) solution containing 10 mM BHMF.

The electrocatalytic oxidation of BHMF, with sample 1-sample 9 as the anode catalyst, respectively, to prepare 2,5-furandicarboxylic acid (FDCA) was conducted, which shows sample 1-sample 9 have similar good catalytic effects. Typically, sample 1 is taken as an example for illustration.

Sample 1 was configured as the anode catalyst, and the test results are shown in FIG. 8 to FIG. 11.

Figure 8:
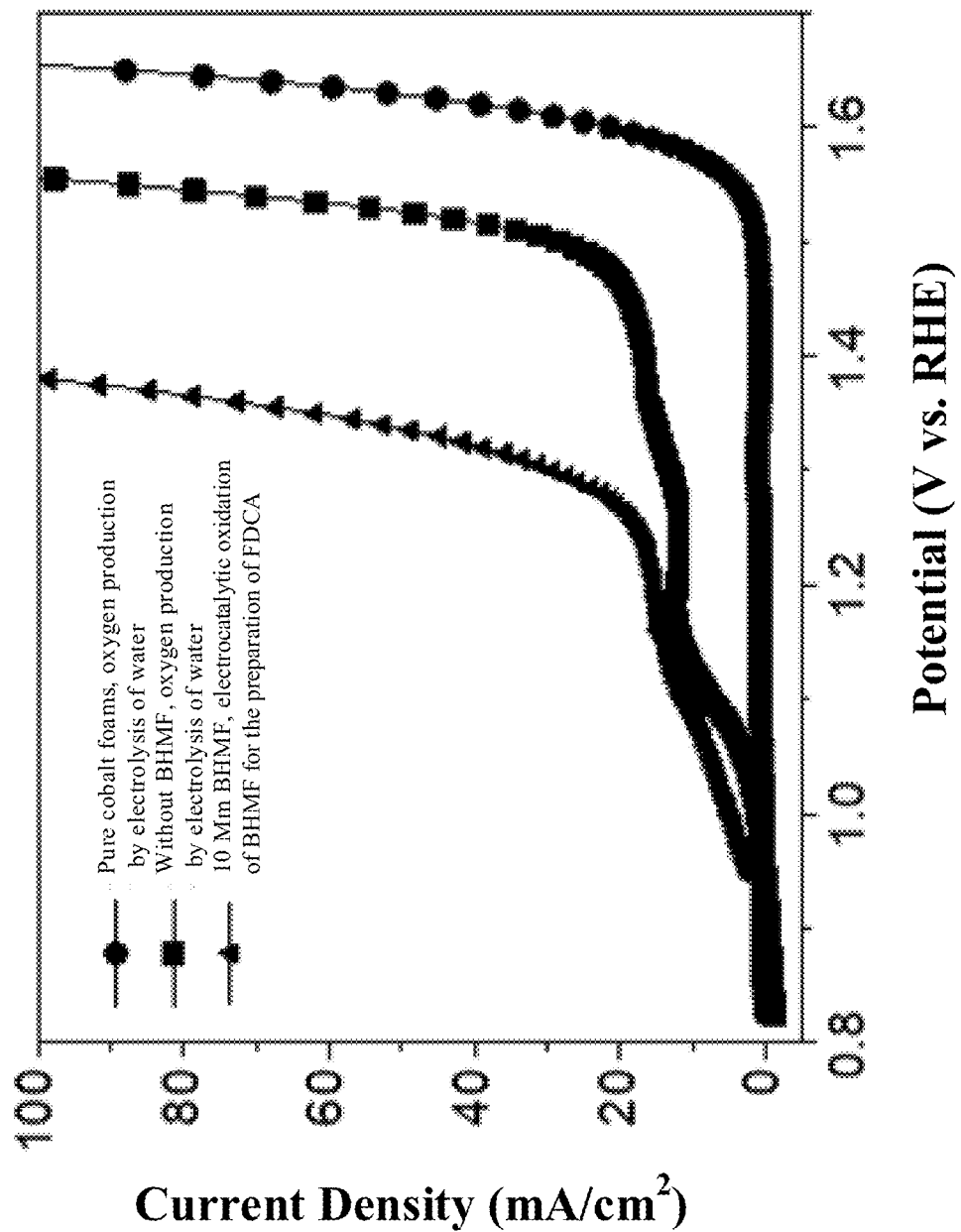
FIG. 8 is current density-potential curves of different electrolytes at the anode in a three-electrode system where sample 1 prepared in Embodiment 1 of the present application is used as an anode catalyst.

FIG. 8 shows that in the three-electrode system, the autogenously grown monolithic hydrangea-like cobalt oxyhydroxide nanosphere catalyst used as the anode catalyst performs better for water electrolysis and oxygen evolution than pure cobalt foams (that is, the potential required to achieve the same current density is lower, and the curve is closer to the Y axis). In the electrocatalytic oxidation of BHMF to prepare FDCA, a lower potential can drive the reaction, thus showing excellent performance.

Figure 9:
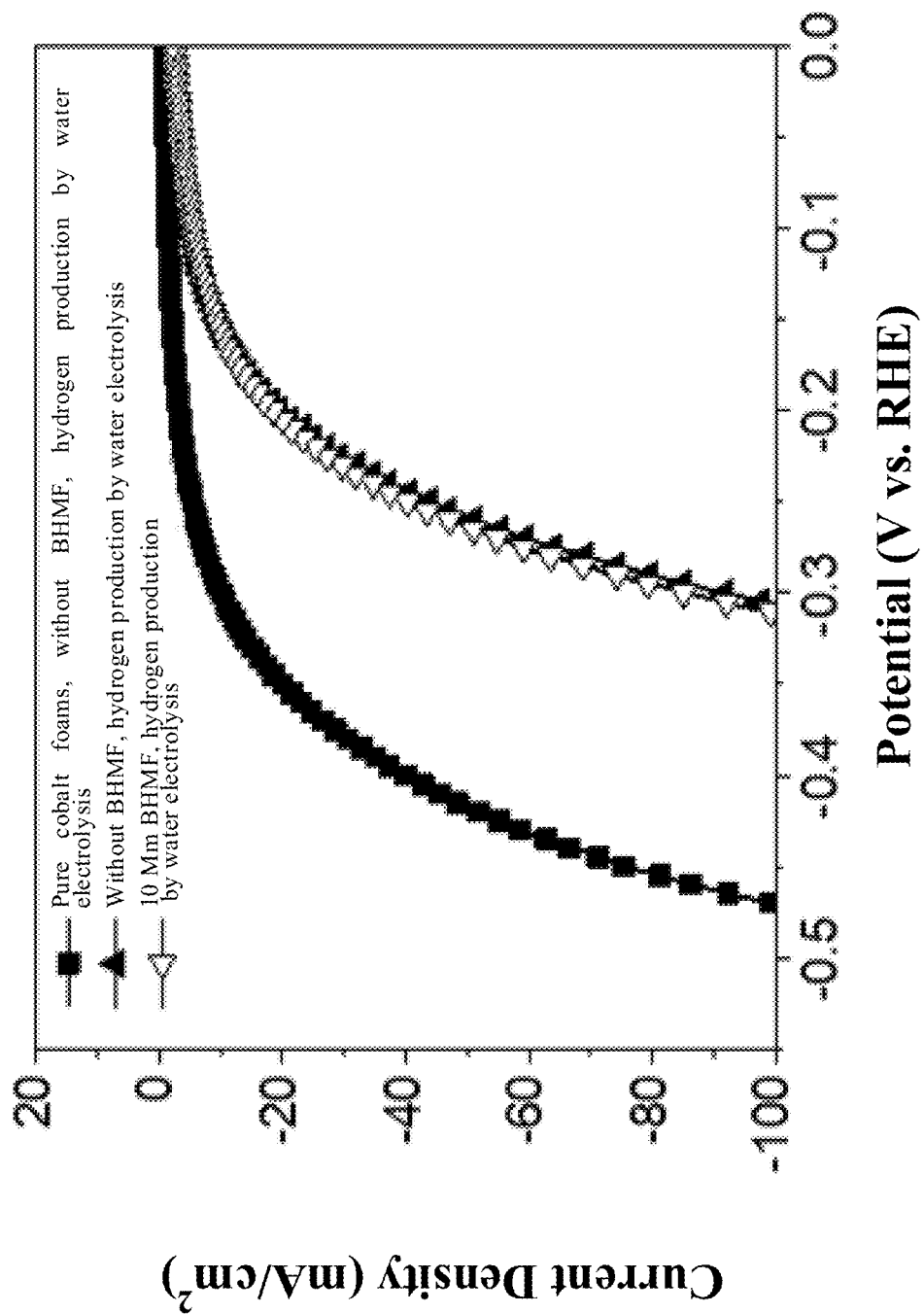
FIG. 9 is current density-potential curves of different electrolytes at the cathode in the three-electrode system where sample 1 prepared in Embodiment 1 of the present application is used as a cathode catalyst.

FIG. 9 shows that in the three-electrode system, the autogenously grown monolithic hydrangea-like cobalt oxyhydroxide nanosphere catalyst also performs much better in water electrolysis and hydrogen production than pure cobalt foams as the cathode (that is, the potential required to achieve the same current density is lower, and the curve is closer to the Y axis). The addition of 10 mM BHMF to the electrolyte has no obvious effect on the hydrogen production performance (the curve has no obvious deviation and basically overlaps), indicating that the catalyst has high hydrogen evolution selectivity.

Figure 10:
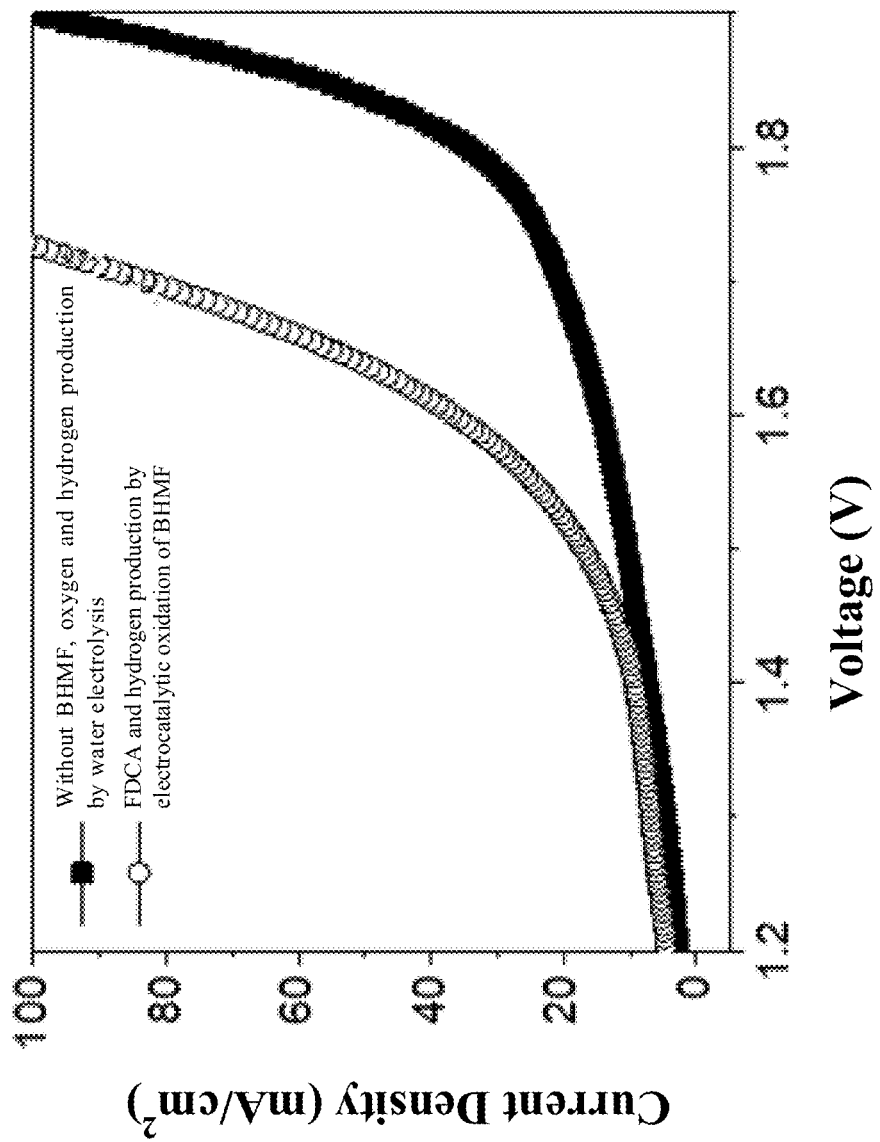
FIG. 10 is current density-voltage curves of different electrolytes in a two-electrode system where sample 1 prepared in Embodiment 1 of the present application is used as both cathode catalyst and anode catalyst.

The sample hydrangea-like cobalt oxyhydroxide nanosphere catalyst prepared in Embodiment 1 was configured as the cathode catalyst and the anode catalyst simultaneously to assemble the two-electrode symmetric electrolytic cell. The electrocatalytic reactions were carried out in the electrolyte without BHMF and in the electrolyte with 10 mM BHMF, respectively. The results are shown in FIG. 10. The electrocatalytic oxidation of BHMF to produce FDCA and the water electrolysis to produce hydrogen were simultaneously conducted, where the overpotential required is 279 mV lower than that of the water splitting alone (the curve is closer to the Y-axis). The results indicate that only a lower energy is required to oxidize BHMF to produce FDCA and reduce water to hydrogen and confirms that the catalyst of the present application has better catalytic performance.

Figure 11:
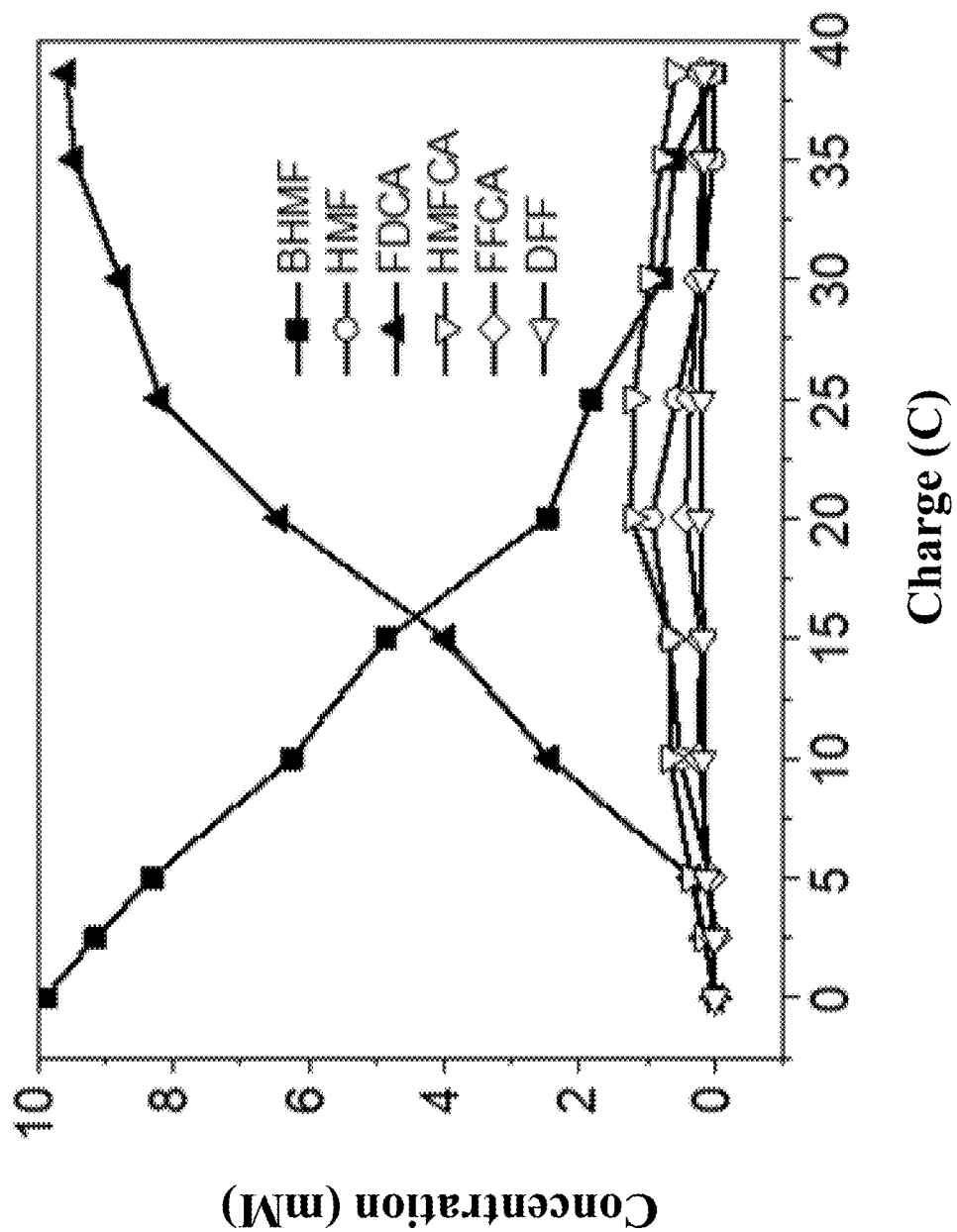
FIG. 11 is concentration-charge curves of the raw material 2,5-furandimethanol (BHMF) and anode products in the two-electrode system where sample 1 prepared in Embodiment 1 of the present application is used as both cathode catalyst and anode catalyst.

The sample hydrangea-like cobalt oxyhydroxide nanosphere catalyst prepared in Embodiment 1 was configured as the cathode catalyst and the anode catalyst simultaneously to assemble the two-electrode symmetric electrolytic cell for the electrocatalytic oxidation of BHMF to prepare FDCA. The results are shown in FIG. 11. The anode products include HMF, FDCA, HMFCA, FFCA, and DFF. The concentrations of HMF, HMFCA, FFCA, and DFF at the end of the reaction were extremely low compared to that of FDCA. The results indicate that the catalyst has high selectivity for FDCA, and the high FDCA selectivity not only ensures a high purity of the product but also results in a very high product yield. Meanwhile, the Faraday efficiency of FDCA is close to 100%, with high energy utilization and almost no energy waste.

All other samples, used as anode catalyst, can achieve similar catalytic effects.

The above are only a few embodiments of the present application, not any form of limitation of the present application. Although the present application is disclosed above with preferred embodiments, the preferred embodiments are not intended to limit the present application. Any variations or modifications made by a skilled person in the art using the above disclosed technical content without departing from the scope of the technical solutions of the present application are equivalent to the equivalent embodiments and fall within the scope of the technical solutions.

What is claimed is:

1. A cobalt catalyst, comprising a carrier and a catalytically active substance; wherein
the carrier is a cobalt-based substrate material;
the catalytically active substance is cobalt oxyhydroxide grown on a surface of the carrier; and
a morphology of the catalytically active substance is hydrangea-like nanospheres.

2. The cobalt catalyst according to claim 1, wherein the catalytically active substance is grown on the surface of the carrier autogenously with the carrier as a cobalt source.

3. The cobalt catalyst according to claim 1, wherein the cobalt-based substrate material is at least one selected from the group consisting of a cobalt foam, a cobalt sheet, a cobalt foil, and a cobalt wire.

4. The cobalt catalyst according to claim 1, wherein a diameter of each of the hydrangea-like nanospheres is 100 nm-500 nm.

5. The cobalt catalyst according to claim 1, wherein a thickness of a sheet layer on a surface of each of the hydrangea-like nanospheres is 1 nm-10 nm.

6. A preparation method of the cobalt catalyst according to claim 1, wherein the method at least comprises:
S100, heating the carrier and a sulfur source in an atmosphere of a protective gas for conducting a reaction to obtain a precursor; and
S200, subjecting the precursor to an electrical activation in an electrolyte to obtain the cobalt catalyst.

7. The preparing method according to claim 6, wherein in step S100, a mass ratio of the sulfur source to the carrier is (2-10): 1; and
the sulfur source is at least one of sublimed sulfur, sodium sulfide, and thiourea.

8. The preparing method according to claim 6, wherein in step S100, a temperature of the reaction under heating is 300° C.-400° C., and a reaction time is 0.25 h-2 h;
a heating rate of the reaction under heating is 5° C./min-10° C./min; and
a flow rate of the protective gas is 10 mL/min-100 mL/min.

9. The preparing method according to claim 6, wherein step S200 comprises:
subjecting the precursor, as an anode, to the electrical activation in the electrolyte, then washing and drying to obtain the cobalt catalyst.

10. The preparing method according to claim 9, wherein the electrolyte is at least one of a potassium hydroxide solution and a sodium hydroxide solution; and
a concentration of the electrolyte is 0.01 M-1 M.

11. The preparing method according to claim 9, wherein methods for performing the electrical activation comprise one of a cyclic voltammetry, a linear voltammetry, a constant current method, and a chronopotentiometry method;
conditions of the electrical activation with the cyclic voltammetry or the linear voltammetry comprise: a potential window of −0.3 V vs. RHE-1.4 V vs. RHE, and an activation time of 0.5 h-4 h;
conditions of the electrical activation with the constant current method comprise: setting a current density of 0.1 mA/cm$^2$-100 mA/cm$^2$, inputting a constant current until a potential is stable, and an activation of 1 min-60 min; and
conditions of the electrical activation with the chronopotentiometry method comprise maintaining a current input for 1 min-60 min within a potential range of 1 V-1.6 V.

12. The preparing method according to claim 9, wherein the drying is conducted at 40° C.-60° C. for 6 h-12 h.

13. The preparation method according to claim 6, wherein the catalytically active substance is grown on the surface of the carrier autogenously with the carrier as a cobalt source.

14. The preparation method according to claim 6, wherein the cobalt-based substrate material is at least one selected from the group consisting of a cobalt foam, a cobalt sheet, a cobalt foil, and a cobalt wire.

15. The preparation method according to claim 6, wherein a diameter of each of the hydrangea-like nanospheres is 100 nm-500 nm.

* * * * *